(No Model.)

T. MARSDEN.
SUCTION BLOWER.

No. 509,321. Patented Nov. 21, 1893.

Witnesses
M. V. Bidgood
S. E. Martin

Inventor
Thomas Marsden
By Knight Bros
attys

THE NATIONAL LITHOGRAPHING COMPANY,
WASHINGTON, D. C.

UNITED STATES PATENT OFFICE.

THOMAS MARSDEN, OF WIGAN, ENGLAND.

SUCTION-BLOWER.

SPECIFICATION forming part of Letters Patent No. 509,321, dated November 21, 1893.

Application filed June 6, 1892. Serial No. 435,740. (No model.)

*To all whom it may concern:*

Be it known that I, THOMAS MARSDEN, colliery manager, a subject of the Queen of Great Britain, residing at Wigan, in the county of Lancaster, in the Kingdom of England, have invented certain new and useful Improvements in Suction-Blowers, of which the following is a specification.

This invention relates to the construction of rotary blowers or ventilators for ventilating mines and other like situations, and particularly to the shaping of the blades, whereby the air, after being guided inward from the side, is more effectively propelled radially outward by centrifugal force, and the volume of air delivered, thereby materially increased.

The construction which I prefer to any other is to form the apparatus of a drum or casting mounted on radial arms, on a revolving shaft. Outside this drum is a larger drum arranged concentrically and a number of hollow blades or arms are provided, branching radially outward, which serve as channels along which the air travels toward the circumference when the blower is in operation.

The invention will be understood from the following description, reference being had to the accompanying drawings, in which—

Figure 1:
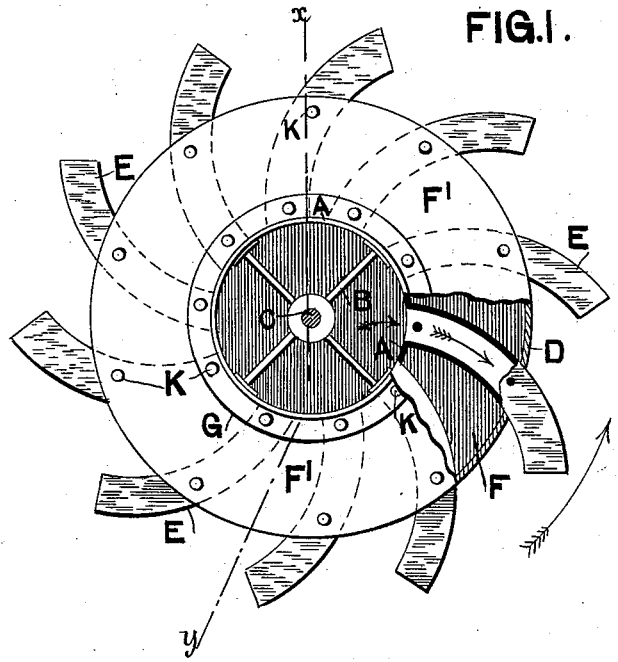
Figure 2:
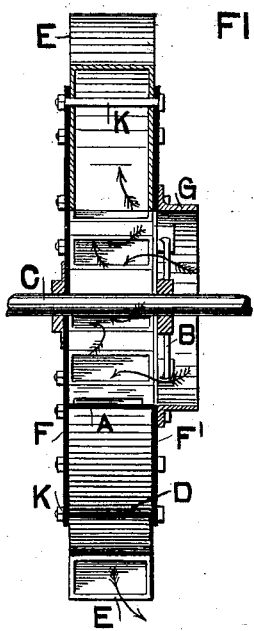
Figure 5:
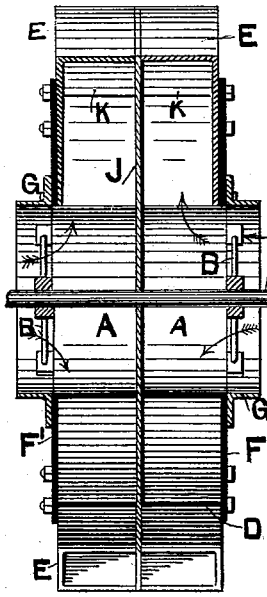
Figure 4:
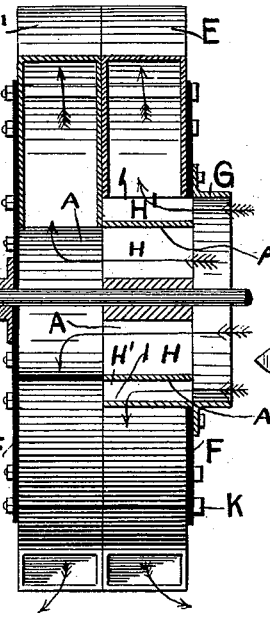
Figure 3:
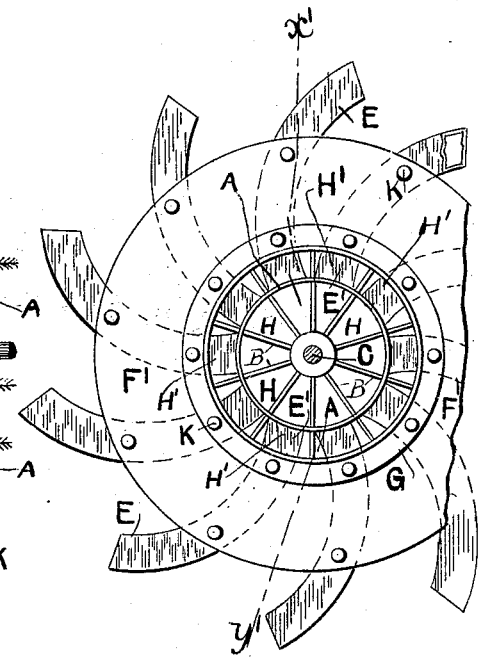

Figure 1 is a front elevation partly in section; Fig. 2 a transverse section on line $x\,y$, Fig. 1; Fig. 3 a side elevation of a double blower or ventilator; Fig. 4 a transverse section of Fig. 3 on the line $x'\,y'$; and Fig. 5 a transverse section of another form of double ventilator in which the air is drawn in on both sides of the blower.

Similar letters of reference indicate like parts in all the figures.

Referring to Figs. 1 and 2—A is the inner drum or casing, mounted on radial arms B, on the revolving shaft C. D is the outside concentric drum, and E the hollow rearwardly curved blades or arms of rectangular shape, in cross section from end to end, and radiating from the inner drum A, in which latter there are orifices corresponding to the number of radiating hollow blades E and by means of which the air entering the interior of the drum A finds an exit through the said blades. F F′ are the side plates of the blower, and G the flange at one side located on the plate F′ for receiving the end of the ventilating pipe, by which the blower is in communication with the interior of the mine, the other side being closed by the plate F.

The mode of action is as follows: When the blower is caused to revolve in the direction of the arrow, the air is drawn axially into the interior of the drum A, and as the plate F closes the opposite side of the drum, the air is deflected in a radial direction through the hollow blades or arms E and caused to issue through the openings at the ends thereof.

The apparatus depicted in Figs. 3 and 4 is a double blower, and is constructed on the same principle as that above described, but the interior of the drum A is, in this case, divided into radial chambers H, and an extra outer drum I is preferably also added, with the radial chambers H′ of which one set of hollow blades E communicates, while the other set E′ terminates in the drum A. The two sets of hollow blades, therefore, form two distinct passages for the air, and the radial chambers H H′ respectively provide one chamber to each outward passage of the radial blades E′ E. The air is drawn in, by the revolution of the blower axially into the radial chambers H, H′ and therefrom delivered by centrifugal force along the passages in the radial blades E′ E respectively.

The general arrangement of the blower, when employed for drawing air in on both sides, is almost identical with the examples above described, but with this exception, that a mid division J (Fig. 5) is, in such case, placed down the middle, or two fans may even be located back to back.

The hollow blades or arms E E′ may be fastened by cross pins K passing through and riveted or bolted to the side plates F F′, or, where great strength is required, they may be attached by angle irons, and even strengthened by struts or otherwise.

I declare that what I claim is—

1. A rotary blower comprising a revolving shaft C, radial arms B secured to the shaft, an inner drum A mounted on the arms, the side plates F′ F, the flange G secured to the side plate F, the outer drum D, secured to the side plates, and the hollow independent and separated radial blades E of rectangular shape in cross-section, and of the same diameter, and curved, from end to end, secured to the inner and outer drums between the side plates; substantially as described.

2. The combination of the revolving shaft C, the radial arms B, secured to the shaft the inner drum A mounted on the arms, the extra drum I mounted on the arms, the inner drum, extra drum and arms providing inner chambers H and outer chambers H', the side plates F', F, the flange G secured to the side plate F', the outer drum D, secured to the side plates, the hollow rearwardly curved radial blades E of rectangular shape in cross section from end to end extending from the outer chambers through the extra and outer drums, and the hollow rearwardly curved radial blades E' of rectangular shape in cross section from end to end, in communication with the inner chambers, and extending through the inner and outer drums; substantially as described.

In testimony whereof I have signed my name to this specification in the presence of two subscribing witnesses.

THOMAS MARSDEN.

Witnesses:
GEO. C. DYMOND,
H. P. SHOOBRIDGE.